UNITED STATES PATENT OFFICE.

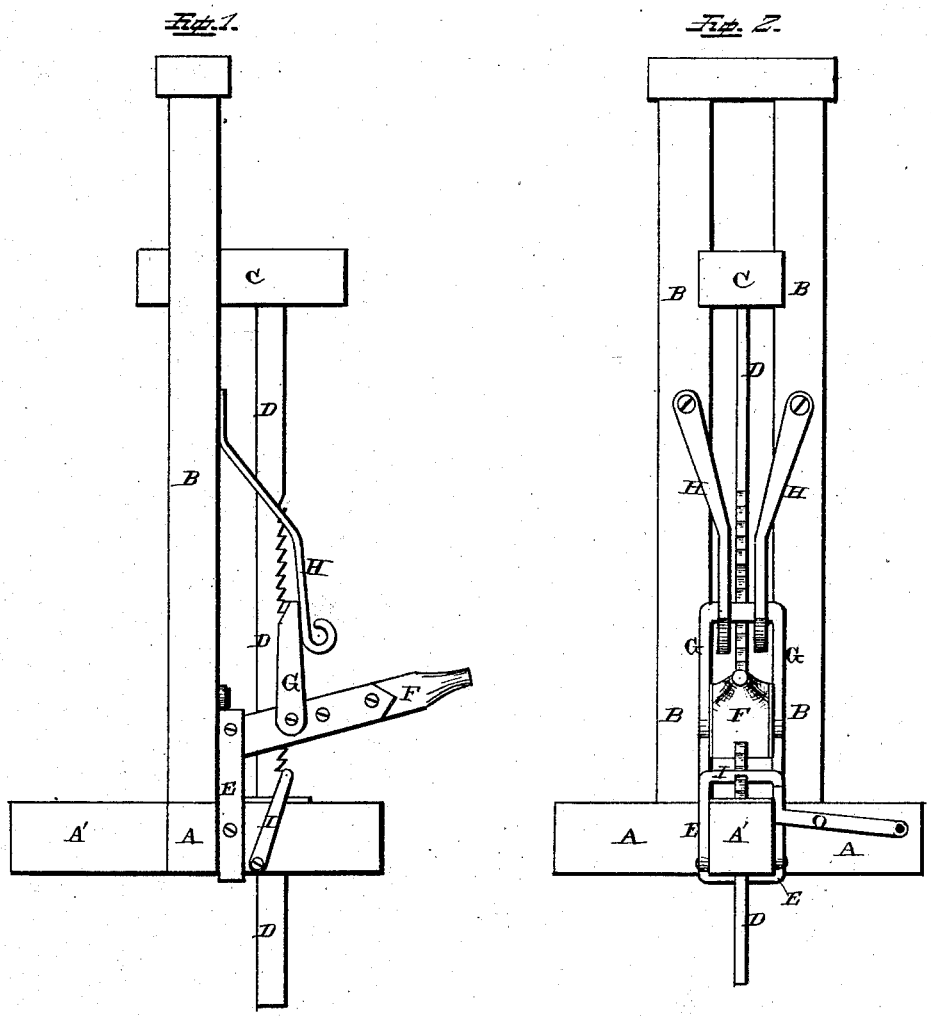

NOFLET R. CORY AND JOHN C. HOLLAND, OF COXVILLE, NORTH CAROLINA.

COTTON AND HAY PRESS.

SPECIFICATION forming part of Letters Patent No. 238,356, dated March 1, 1881.

Application filed January 3, 1881. (Model.)

*To all whom it may concern:*

Be it known that we, N. R. CORY and JNO. C. HOLLAND, of Coxville, in the county of Pitt and State of North Carolina, have invented certain new and useful Improvements in Cotton and Hay Presses; and we do hereby declare the following to be a full, clear, and exact description of the invention, such as will enable others skilled in the art to which it pertains to make and use it, reference being had to the accompanying drawings, which form part of this specification.

Our invention relates to an improvement in hay and cotton presses; and it consists in pivoting to each end of the frame an operating-lever, which is provided with a pawl or dog which is held against the ratchet-bar by means of two springs, and pivoting to the ground-sill of the press a dog which is also held in contact with the ratchet-bar by a spring, for the purpose of preventing the ratchet-bar, which is attached to the follower, from moving backward after it has been forced downward by means of the operating-lever, as will be more fully described hereinafter.

The object of our invention is to pivot the lever directly to the vertical timbers of the press, so as to have it always maintain the same position, and be held as rigidly in position as possible.

Figure 1 is a side elevation of our invention. Fig. 2 is a front elevation of the same.

A A represent the two front sills of the press, and B B the two vertical timbers thereof, which are rigidly secured to the ground-sills at their lower ends. The two vertical timbers are separated from each other just far enough to allow the beam C, which is fastened to the follower, to work up and down between them, and secured to the under side of this beam C is the flat ratchet-bar D, by means of which the follower is operated.

Secured to the under side of the ground-sill A', which extends longitudinally under the press, is the U-shaped casting E, which has its upper end fastened to the vertical timbers B, and pivoted between its upper ends is the operating-lever F. This lever has a slot cut through its inner end, so as to allow the flat ratchet-bar to pass through it, and secured to the lever and projecting up along the side of the ratchet-bar, is the pawl G. This pawl has its upper end so shaped as to catch in the teeth of the ratchet-bar and bearing against the outside of the pawl so as to keep it pressed against the ratchet are the two springs H. These springs are pivoted at their upper ends to the vertical timbers, and can be turned out to one side, so as to let the pawl drop backward, while the follower, together with the ratchet-rod, is being raised upward, ready to press any other bale. Also, pivoted to the longitudinal ground-sill of the press is a second pawl, I, which bears against the ratchet-rod just underneath the lever, and, by catching in the teeth of the rod, prevents the follower from springing upward while the lever is being raised for another downward pull. This pawl is also pressed against the ratchet-bar by means of the pivoted spring O, which spring can be turned to one side, so as to allow the pawl to drop backward, and thus leave the ratchet-rod free to be raised, while the bale which has just been pressed is being taken from the press, or when the follower is raised for the purpose of allowing the press to be filled. By thus securing the operating parts directly to the timbers of the press a much steadier, firmer, and more reliable operating mechanism is produced than where the parts are suspended from the beams above.

Having thus described our invention, we claim—

The combination of the two sills A and the two timbers B with the ratchet-bar, the U-shaped casting E, having its upper end secured to the vertical timbers, and having the operating-lever pivoted between its upper ends, the pawl G, pivoted springs H, the pawl I, and the operating-spring O, the parts being arranged and combined substantially as shown and described.

In testimony that we claim the foregoing we have hereunto set our hands this 21st day of December, 1880.

NOFLET RHODES CORY.
JOHN C. HOLLAND.

Witnesses:
FRED HARDING,
JAMES W. NELSON.